United States Patent [19]

Usui et al.

[11] Patent Number: 4,932,600
[45] Date of Patent: Jun. 12, 1990

[54] METHOD FOR WINDING MAGNETIC TAPE

[75] Inventors: Mitsunobu Usui; Masaaki Sakaguchi, both of Kanagawa, Japan

[73] Assignee: Fuji Photo Film Co., Ltd., Kanagawa, Japan

[21] Appl. No.: 313,845

[22] Filed: Feb. 23, 1989

[30] Foreign Application Priority Data

Feb. 23, 1988 [JP] Japan .................................. 63-38736

[51] Int. Cl.⁵ ............................................. B65H 18/00
[52] U.S. Cl. ................................... 242/67.1 R; 242/76
[58] Field of Search ............................. 242/67.1 R, 76

[56] References Cited

U.S. PATENT DOCUMENTS 4,783,020 11/1988 Sakaguchi et al. ................... 242/76

FOREIGN PATENT DOCUMENTS 61-51642 3/1986 Japan .

Primary Examiner—Stuart S. Levy
Assistant Examiner—Steven B. duBois
Attorney, Agent, or Firm—Sughrue, Mion, Zinn, Macpeak & Seas

[57] ABSTRACT

A method for winding a magnetic tape in which, at the position where the magnetic tape is being wound onto a flanged tape winding body, a magnetic field is applied to the magnetic tape in the vicinity of the tape winding body to urge the magnetic tape in a direction of the width of the tape, while simultaneously the tape is guided in such a manner that a relative position in the direction of the width of the tape between a corner, defined by an inner surface of one flange of said tape winding body toward which the magnetic tape is attracted by the magnetic field and a core portion of the tape winding body, and one lateral edge of the magnetic tape facing said inner surface of said flange ranges in the vicinity of the outer periphery of said flange varies from a position where there is a space of 0.5 mm between the corner and the one lateral edge to a sliding contact position where the two overlap each other in an amount of 0.5 mm.

9 Claims, 5 Drawing Sheets

METHOD FOR WINDING MAGNETIC TAPE

BACKGROUND OF THE INVENTION

The present invention relates to a magnetic tape winding method for use in the cases where a magnetic tape is wound onto a tape winding body from a raw magnetic tape roll having the same width as that of the final product, where a magnetic tape already wound on a tape winding body is rewound onto another tape winding body, and where a magnetic tape from a roll of raw tape having a width larger than that of the final product is cut and wound into a plurality of raw tape rolls of the same width as that of the final product.

Processes for manufacturing magnetic tapes such as audio cassette tapes, video cassette tapes, memory tapes, broadcast video tapes, and the like include as intermediate steps, steps such as a take-up step of taking up a magnetic tape of a predetermined length onto a small capacity tape winding body such as a reel, hub or the like from a long roll of raw magnetic tape, a retake-up step of taking up a magnetic tape already wound on a tape winding body so as to rewind it onto another tape winding body, and a take-up step of cutting and taking up a magnetic tape of a raw roll having a width larger than that of the final product into a plurality of rolls of raw tape of the same width as that of the final product.

In the case where a magnetic tape is wound onto a tape winding body in the tape-up and retake-up steps described above, there may occur a problem that due to the physical properties of the roll of the raw magnetic tape at its feed side, the physical properties of the tape winding body at the tape take-up side, and the physical properties of the magnetic tape itself, there occurs a change in tape movements such as vibration of the tape in the directions of its thickness and width, resulting in a problem in the finally wound state of the tape. Specifically, the winding surface (the end edge of the tape) may have an uneven and ragged appearance when observed in the axial direction of the tape winding body. In general, the higher the running speed of the tape, the greater is this tendency.

In magnetic tapes suffering this difficulty, not only is the poor appearance bothersome, but damage can occur to the edges of the tape. Also, the electromagnetic conversion characteristics of the tape may be degraded. The problem is particularly acute when high density recording is to be carried out, specifically, on a video magnetic tape where audio signals must be recorded near the side edges of the tape. Therefore, the above winding problem has been an extremely serious problem.

For this reason, in the conventional magnetic tape production process, the wound state is checked, for example, by visual inspection or the like, for all products after the above-mentioned take-up or retake-up steps. This requires much cost and time and creates a serious bottleneck in the production of magnetic tapes.

In order to improve the winding appearance to thereby reduce the need for manual checking, a system called "style winding", as illustrated in FIGS. 8 and 9, has been employed in magnetic tape take-up process in which the yield of products of good winding appearance is generally poor.

FIGS. 8 and 9 are the schematic perspective views each showing the arrangement in the vicinity of a tape winding body 2 at the tape-up side. In the arrangement shown in FIG. 8, a flexible endless belt 11 made of, for example, rubber, polyimide, or the like is rotatably held by rotary rollers 12, 13 and 14 so as to rotate together with a magnetic tape T. The flexible belt 11 elastically urges the magnetic surface of the tape in the radial direction of the tape winding body 2 to thereby determine the winding appearance of the magnetic tape T. In the arrangement shown in FIG. 9, a belt 15 made of a comparatively soft nonwoven fabric or the like is laid between one flange of the tape winding body 2 and a side edge of the magnetic tape T. This belt 15 is arranged so as to urge a lateral edge of the magnetic tape T to arrange the winding appearance of the magnetic tape T while the belt 15, supplied from a belt-feed side 16, is moved at a low constant speed while being held by a rotary roller 17 or the like and then taken up on a belt take-up side 18.

In both arrangements, however, the belt directly contacts the magnetic tape T, resulting in various problems such as the occurrence of drop-out due to fragments dislodged from the magnetic layer or peeled from the fabric of the belt, transformation of the tape due to application of inappropriate pressure to the tape, and damage to the tape at its lateral edges. Thus, sometimes these arrangements fail to accomplish the intended function. Further, the style winding mechanism has problems in terms of a high cost and the need for frequent operator intervention to replace the belt supply due to the high consumption rate of the belt material. Still further, the winding mechanism must be arranged such that, when the tape winding body 2 is replaced, the mechanism can be moved between operative and inoperative positions. As a result, the take-up apparatus is necessarily complicated in structure, and it takes a relatively long time to replace the tape winding body. Therefore, the tape winding time remains an obstruction to improving tape manufacturing productivity.

In current tape winding practice, various tape winding techniques are known, including the in-cassette, C-O and V-O take-up systems in which a magnetic tape is wound into the cassette at a final stage of cassette assembly. This technique is thus significantly different from the above-mentioned open take-up system in which the wound magnetic tape is inserted into the cassette after style winding of the tape.

As shown in FIGS. 10 and 11, a semi-finished product (generally called V-O, C-O, or the like) includes all parts other than the magnetic tape assembled into a cassette 23. The tape feed-out and take-up winding bodies 2 and 3 are connected together by a leader tape 10. The leader tape is drawn out and cut by a tape-up apparatus called an in-cassette winder. One cut end of the leader tape is spliced to an end of the magnetic tape to be wound into the cassette, while the other cut end of the leader tape is held by a suction member 22. The tape winding body 2 having the leader tape connected to the magnetic tape is rotated to take up a predetermined length of the magnetic tape T. Then, the magnetic tape is cut, and finally the cut end of the wound-up magnetic tape is spliced to the other cut end of the leader tape to complete the product.

In such an in-cassette take-up system, no part of the described tape winder mechanically contacts the tape winding body as the magnetic tape is wound. Therefore, the winding appearance of the finally wound tape depends on the physical properties of the tape itself and variations in cassette components, thereby making it completely impossible to control the winding appearance, resulting in an extremely poor yield of cassettes with a good winding appearance.

In this case, in order to improve the winding appearance, it has been attempted to use a roller 24 with a pair of upper and lower flanges 25a and 25b disposed at the inlet side of the cassette. The roller 24 applies a widthwise force to the magnetic tape as it is being wound into the cassette to thereby urge the magnetic tape to one side. With this arrangement, however, actually very little improvement in the winding appearance is achieved. Thus, prior to the invention there has been no effective measure to improve the winding appearance of the magnetic tape.

SUMMARY OF THE INVENTION

The present invention has been made in view of the above circumstances, and an object of the invention is to provide a magnetic tape winding method with which a magnetic tape can be wound onto a tape winding body with a good winding appearance even if variations occur in some of the physical properties of the tape.

Another object is to provide a magnetic tape winding method which does not require a complicated construction of the tape winding apparatus and which does not degrade the quality of the tape due to the above-mentioned secondary effects, as is the case with the above-mentioned style winding system requiring direct contact with the magnetic tape, and which also results in an improved operability in the tape winding step.

A further object is to provide a magnetic tape winding method which can effectively improve the winding appearance of the tape when using an in-cassette winding system.

These and other objects of the present invention have been achieved by a method for winding a magnetic tape wherein, when a magnetic tape is to be wound on a flanged tape winding body, a magnetic field is applied to the magnetic tape in the vicinity of the tape winding body to urge the magnetic tape in the direction of the width of the tape, wherein the travel of the magnetic tape is guided in such a manner that a relative position in the direction of the width of the tape between a corner, defined by an inner surface of one flange of the tape winding body toward which the magnetic tape is attracted by the magnetic field and a core portion of the tape winding body, and one lateral edge of the magnetic tape facing the inner surface of the flange in the vicinity of the outer periphery of the flange ranges from a spaced position where there is a space of 0.5 mm between the corner and the one lateral edge to a sliding contact position where the two overlap each other in an amount of 0.5 mm. In other words, the magnetic tape is guided as it is being wound on the flanged tape winding body in such a manner that the distance between a lateral edge of the tape facing an inner surface of one flange of the tape winding body and a plane passing through the intersection between the inner surface of this flange and the core of the tape winding body is in a range of −0.5 to +0.5 mm.

DESCRIPTION OF THE PREFERRED EMBODIMENTS

Figure 1:
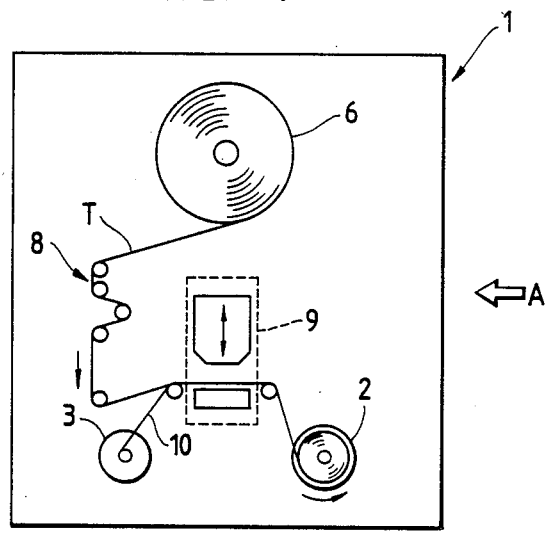
FIG. 1 is a schematic front-elevational view of a winding apparatus used for performing a method according to the invention.

Preferred embodiments of the present invention illustrated in the drawings will now be described.

Figure 2:
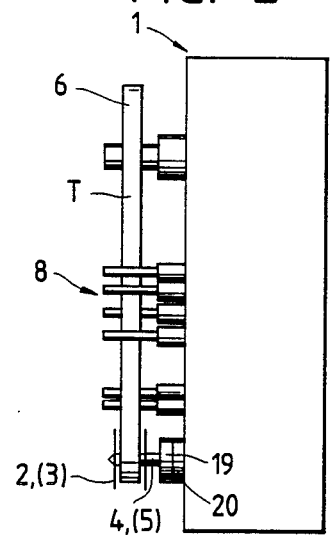
FIG. 2 is a schematic side-elevational view of the apparatus of FIG. 1.

FIG. 1 is a schematic front-elevational view of a preferred embodiment of a magnetic tape winding apparatus 1 for carrying out a magnetic tape winding method of the invention, and FIG. 2 is a side-elevational view of the same apparatus as viewed in the direction of an arrow A. This tape winding apparatus 1 may be used, for example, in the implementation of a method in which a magnetic tape T is wound on a pair of tape winding bodies 2 and 3 (hereinafter referred to as tape reels) to be incorporated in a video tape cassette. The tape reel has flanges each of which is tapered at a rate from 1/50 to 1/300.

The operation of the tape winding apparatus 1 will now be described. First, the tape reels 2 and 3 are connected by a leader tape 10 of a predetermined length (only half of which is shown on one side in FIG. 1). After the tape reels 2 and 3 are mounted on respective drive shafts 4 and 5 which can be driven for rotation in the winding apparatus 1, the tape leader 10 is cut off generally in the middle thereof. The cut end of one part of the tape leader connected to the tape reel 2 is connected by a connecting tape or the like to a forward end of a raw magnetic tape roll 6 provided in advance. Then, after the magnetic tape T is wound around the tape reel 2 a predetermined length, it is cut off. The cut end of the magnetic tape is connected to the cut end of the other part of the tape leader 10 connected to the tape reel 3.

The cutting of the leader tape 10 and the magnetic tape T as well as the connection of the leader tape 10 to the magnetic tape T is carried out by a cutting and connecting unit 9 including a tape end holding member, a cutter, and a connecting tape supplying device. The magnetic tape T fed from the raw tape roll 6 is wound on the tape reel 2 after passing along a travel path 8 defined by guide pins, guide rollers and the like. (The cutting and connecting unit 9 is omitted from FIG. 2.)

Figure 3:
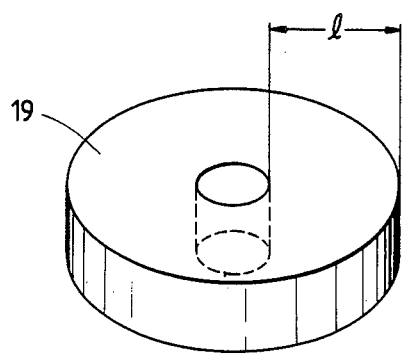
FIG. 3 is an enlarged perspective view of a magnet shown in FIG. 2.

So far as the above description of the present winding apparatus is concerned, it is similar to the conventional device. The present invention relates primarily to the arrangement for mounting the tape reel 2. More specifically, one feature of the invention is that a permanent magnet 19 of a doughnut-shape as shown in FIG. 3 is mounted on a shaft 4 received in a central hole of the tape reel 2 for taking up the magnetic tape T. Another feature of the invention is that the magnetic tape T is wound around the tape reel 2 in such a manner that the relative position in the direction of width of the tape between one lateral edge 27 of the magnetic tape T, which edge faces the above-mentioned magnet, and a corner 28 defined by an inner surface of one flange of the tape reel 2 close to the magnet and a core portion 2b of the tape reel 2 ranges from a spaced position where there is a space of 0.5 mm between the one lateral edge 27 and the corner 28 to a sliding contact position where the two overlap each other in an amount of 0.5 mm. Preferably, the tape winding operation is carried out with this relative distance being in the range of −0.2 to 0 mm. The term "sliding contact position" refers to the condition shown in FIG. 4, and the term "spaced position" refers to the condition shown in FIG. 5. These are sometimes referred to collectively as the "tape urging margin".

Figure 4:
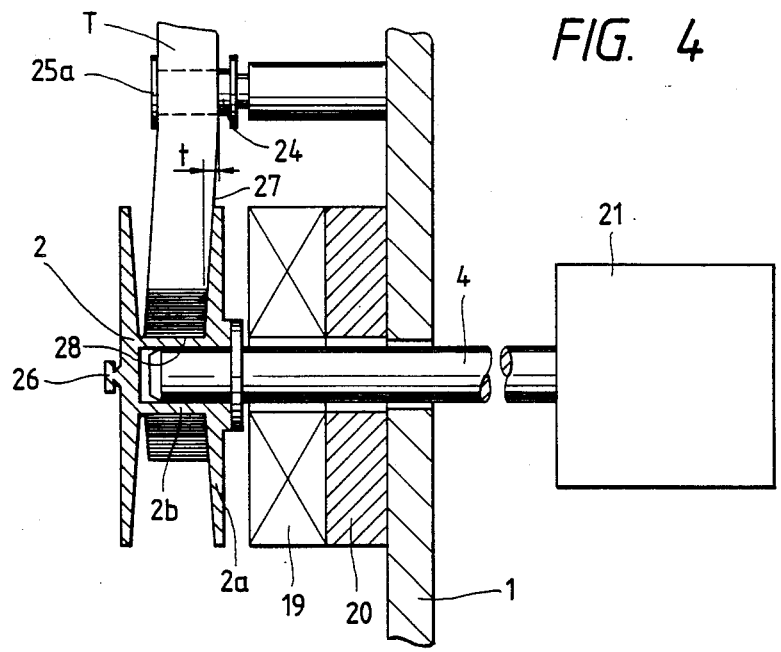
FIGS. 4 and 5 are enlarged axial cross-sectional views of the same apparatus.

The permanent magnet 19 is mounted on the body of the winding apparatus 1, for example, through a support member 20, and is disposed close to the one flange 2a of the tape reel 2, as shown in FIG. 4. It is preferred that the radial width 1 of the permanent magnet 19 in the radial direction of the tape reel 2 be at least be greater than the radial width of the roll of the magnetic tape T wound around the tape reel 2. The direction of the magnetic field of the permanent magnet 19 is generally parallel to the longitudinal direction of the shaft 4.

The shaft 4 is connected to a drive device 21 such as a motor so as to be driven for rotation.

When a magnetic tape T is taken up with the above-mentioned winding arrangement, the magnetic tape T is pulled toward the permanent magnet 19 so that the magnetic tape is wound on the tape reel with the one lateral edge 27 thereof held in contact with the flange 2a close to the magnet. The magnetic tape already wound on the tape reel 2 is also subjected to the force of the magnetic field as a whole, and therefore is stably held in position. In other words, the urging force created by the magnetic field and acting on the magnetic material of the tape is applied to the magnetic tape in non-contacting relation to the magnetic tape T.

Further, the position of the path of travel of the magnetic tape T is controlled by a roller 24 mounted immediately before the tape reel 2. More specifically, as shown in FIG. 4, one flange 25a of the roller 24 serves to slightly urge the other lateral edge of the magnetic tape T opposite to the one lateral edge 27 close to the magnet in such a manner that the one lateral edge 27 of the magnetic tape is kept in a sliding contact condition in the vicinity of the outer periphery of the flange 2a of the tape reel, that is, the tape is offset toward the magnet a distance of t mm from the corner 28 of the reel core portion 2b close to the magnet. In the case illustrated in FIG. 5, the other flange 25b of the roller 24 serves to slightly urge the one lateral edge 27 of the magnetic tape close to the magnet in a direction opposite to the direction of attraction of the magnet in such a manner that the lateral edge 27 of the magnetic tape is kept in a spaced condition in the vicinity of the outer periphery of the flange 2a, that is, offset toward the median plane of the tape reel 2 a distance of t from the corner 28 of the reel core portion 2b close to the magnet.

Thus, two different lateral forces, namely, the urging force created by the magnetic field and the urging force of the roller 24, are applied to the magnetic tape T just as it is being wound around the tape reel 2. Therefore, the magnetic tape T is always kept under a suitable tension to thereby stabilize the motion of the tape.

Figure 5:
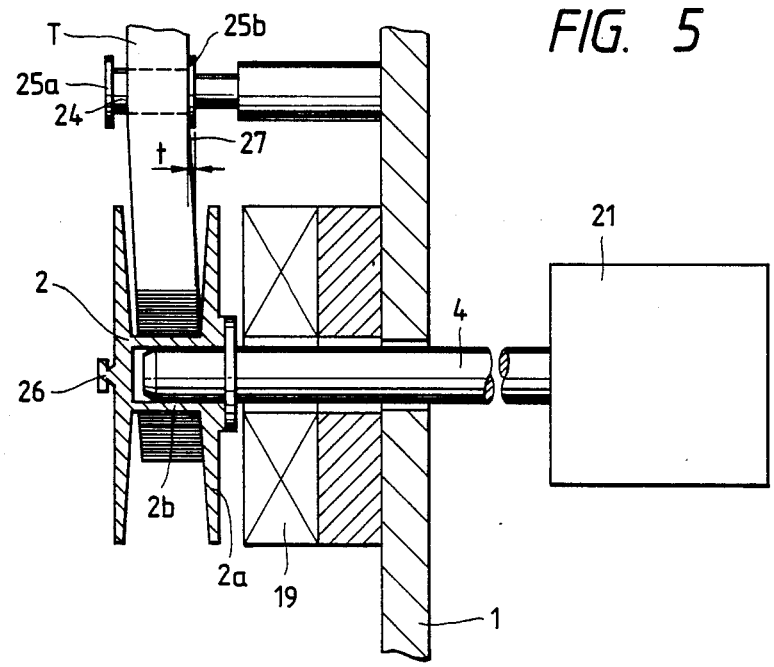

The urging force of the flange 25b, as shown in FIG. 5, is of such a magnitude that the magnetic tape T can still be attracted toward the flange 2a by the magnet 19. In other words, this urging force is of such a degree that the magnet 19 provides an effective influence on the deflected magnetic tape. Representing this degree in terms of the amount of offset of the magnetic tape T, good results were obtained with a distance t of not more than 0.5 mm. When this value is represented in terms of the tape urging margin, it can be referred to as tape urging margin in a negative or minus direction since this urging force is applied in a direction opposite to the direction of attraction of the magnet 19.

As shown in FIG. 4, when the urging force by the flange 25a is represented in terms of the amount of offset of the magnetic tape T, good results are obtained with a distance t (the tape urging margin) of not more than +0.5 mm, taking into account the degree of contact between the tape lateral edge 27 and the flange 2a.

As described above, the magnetic field and the roller 24 act on the magnetic tape T such that the tape is not subjected to winding irregularities in the direction of width of the tape, and therefore the tape can be wound in a very desirable fashion.

Particularly, when the magnetic tape is wound at a high speed, air is unavoidably introduced into the space between the already-wound roll and the tape as it is being wound onto the roll due to the winding movement of the magnetic tape. As a result, that portion of the magnetic tape T which is being wound has a strong tendency to be displaced in the direction of width of the magnetic tape. However, with the use of the invention, such winding irregularities are eliminated.

The magnetic field intensity of the magnet 19 is not particularly limited. For example, it can be determined in dependence on various factors such as the tension under which the magnetic tape is to be wound, the type of the magnetic tape, the distance between the magnet 19 and the magnetic tape T, the winding speed (the speed of travel of the tape) and the influence of the magnetic field on the magnetic tape T. After the winding operation is complete, the wound magnetic tape may be degaussed if necessary.

In the above embodiment, although the permanent magnet 19 is fixed in a predetermined position, the invention is not restricted to such an embodiment. That is, the magnet may be arranged so as to be movable along the shaft 4 to vary the magnetic intensity applied to the magnetic tape, and the roller 24 may also be made displaceable in the direction of width of the magnetic tape T. Further, with respect to the configuration of the permanent magnet 19, it is not always necessary for the magnet to have a doughnut shape substantially identical to that of the flange of the tape reel 2 and to extend around the entire periphery of the shaft. In other words, the magnet may be so arranged that it applies the magnetic field to the magnetic tape T only in a region where the magnetic tape T is wound around the tape reel 2. Further, the shape of the magnet can be varied in various ways.

Figure 6:
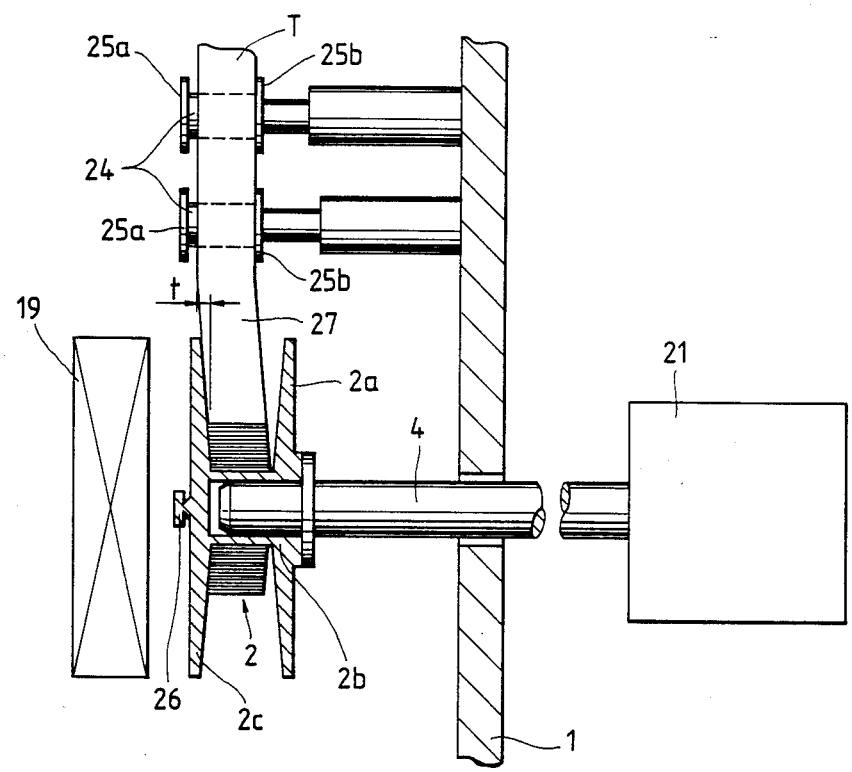
FIG. 6 is a cross-sectional view showing another embodiment of the invention.
Figure 7:
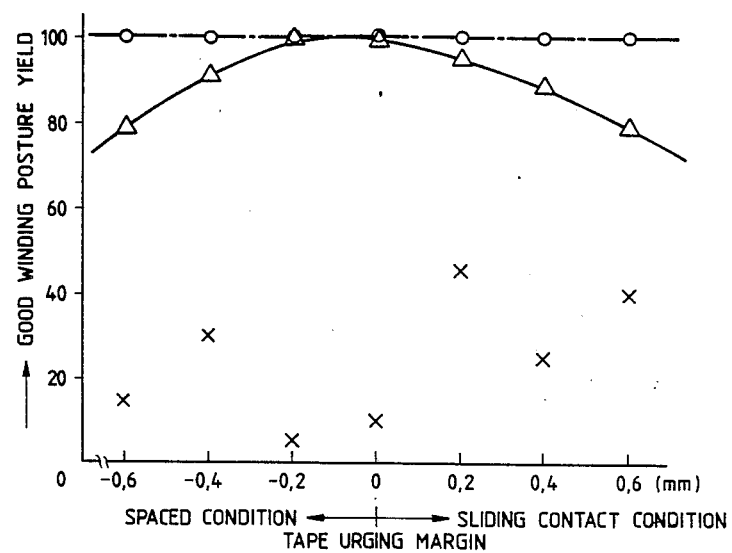
FIG. 7 is a graph illustrating the relation between a good winding yield and a tape urging margin.
Figure 8:
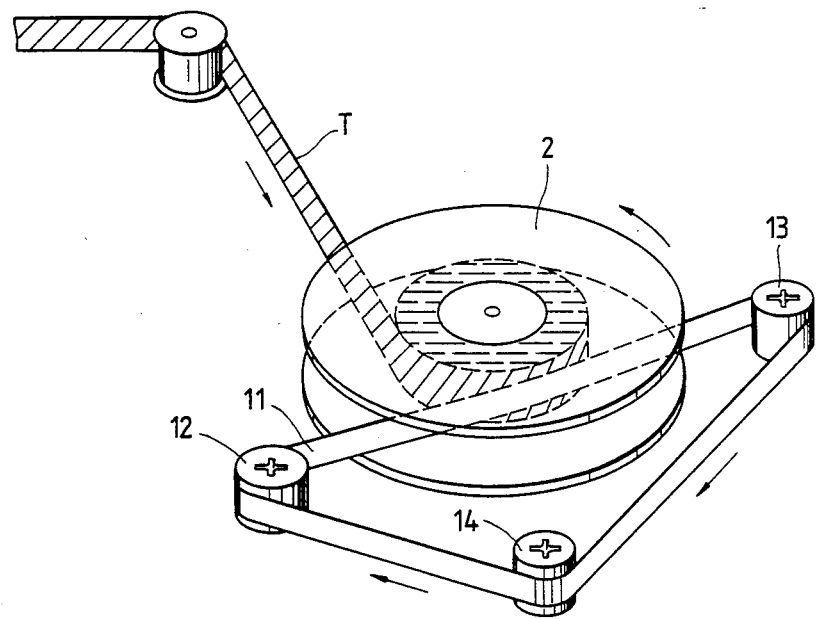
FIGS. 8 and 9 are schematic perspective views of portions of respective conventional winding apparatuses.
Figure 9:
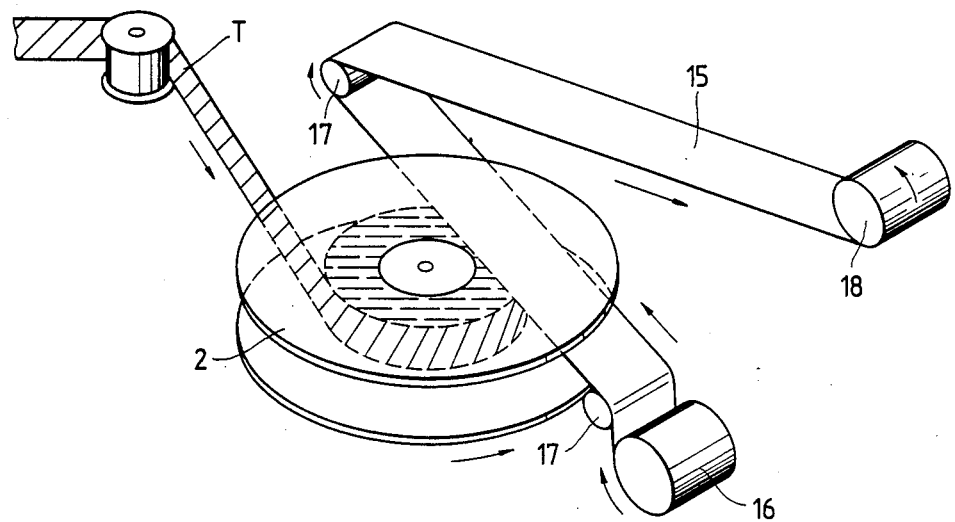
Figure 10:
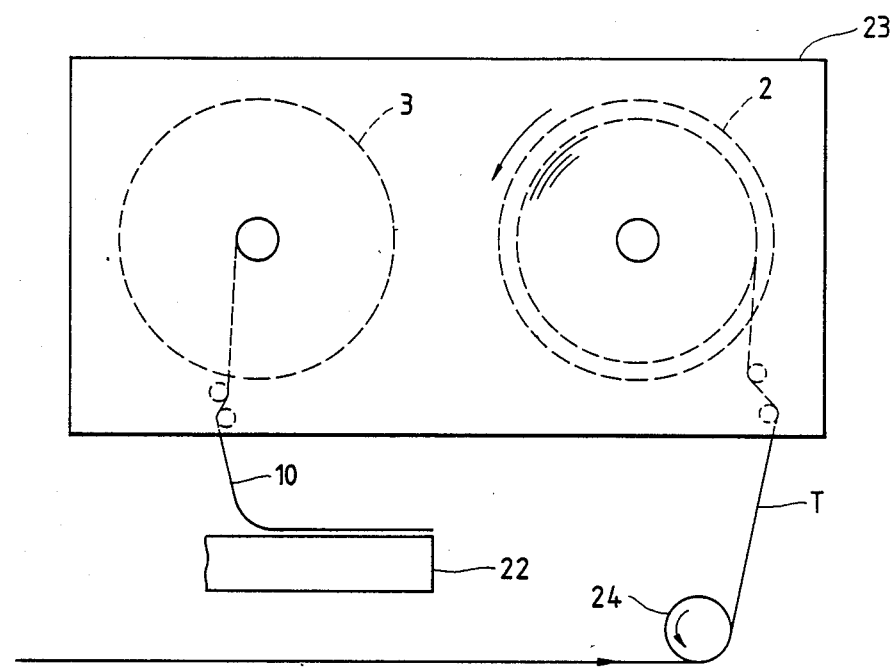
FIG. 10 is a schematic top plan view of a conventional winding apparatus employing an in-cassette winding technique.
Figure 11:
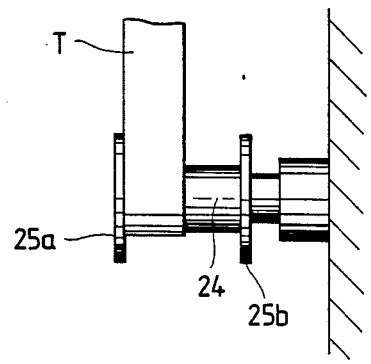
FIG. 11 is an enlarged side-elevational view of a portion of the apparatus of FIG. 10.

In the above-illustrated embodiment, the permanent magnet 19 is disposed on the side of the flange 2a (lower flange) of the tape reel 2, but the invention is not limited to such embodiment. The permanent magnet 19 may be disposed on the side of the flange 2c (upper flange) as shown in FIG. 6, in which instance the permanent magnet 19 can be of a disc shape since its shape is not limited by the shaft 4 and other associated parts. FIG. 7 shows the sliding contact condition. In this case, rollers 24 and 24 act upon the tape in a direction opposite to that shown in FIG. 4. Further, by virtue of the provision of the two rollers 24 and 24, the forces exerted by each of the flanges 25a and 25b of the two rollers in contact with the lateral tape edge 27 can be reduced.

In the above embodiments, although the permanent magnet 19 is disposed on one side of the tape reel 2, the invention is not restricted to such embodiments. For example, another magnet may be provided on the other side of the tape reel 2 so that the tape reel is interposed between the two magnets, thereby producing magnetic lines of force between the two magnets. In this case, the direction of the magnetic lines of force acting on the tape reel 2 is completely parallel to the longitudinal direction of the shaft 4. Therefore, the force exerted on the magnetic tape T has a very stable directional property. Also, in this case, it will be readily appreciated that in order to bias the magnetic tape laterally in one direction, the magnetic field intensities of the two magnets as well as the relative position between the magnetic tape T and the magnets should be suitably determined.

In the above embodiments, although the magnet is implemented with a permanent magnet, the invention is not restricted to such embodiments, and an electromagnet may be employed. In this case, the magnetic force of the electromagnet can be varied by changing the amount of electric current flowing therethrough.

In the above winding apparatus 1, although the magnet is mounted only on or in the vicinity of the shaft 4, the invention is not restricted to such a construction. For example, other magnets may be suitably disposed along the travel path system 8 for the magnetic tape T so as to apply a magnetic force to the magnetic tape in the direction of width of the tape, thereby restraining the lateral movement of the magnetic tape T to achieve even more stable travel of the tape.

Further, although the invention has been specifically described with respect to winding apparatuses of the open reel-type, the invention can also be applied to a winding apparatus of the in-cassette winding type. Further, the invention is applicable to a winding apparatus of the type in which a magnetic tape from a raw roll having a width larger than that of the final product is cut and wound into a plurality of rolls of raw tape of the same width as that of the final product.

As described above in detail, in accordance with the present invention, when winding the magnetic tape, a magnetic field is utilized to draw the magnetic tape in the direction of the width of the tape, and also a lateral force is imposed on the magnetic tape by a flanged roller disposed near the position where the magnetic field acts on the tape. With this arrangement, a suitable tension is applied to the portion of the magnetic tape just prior to the wound roll. Therefore, even if the magnetic field acting on the tape is very weak, the running of the magnetic tape is very stable as compared with the case where only a magnetic field is utilized. In addition, since the contact pressure exerted by the roller is very low, there is no danger of damaging the lateral edge of the magnetic tape, thereby maintaining the good winding appearance of the tape.

In the present invention, it can be said that the force required for achieving a good winding status (winding appearance) is applied to the magnetic tape in an almost non-contact fashion. Therefore, the invention overcomes the disadvantages suffered by prior art magnetic tape winding apparatuses which employ contact guiding, such as folding of the magnetic tape, which can cause damage to the lateral tape edge and damage to the magnetic surface of the tape. Thus, the quality of the magnetic tape is improved with the use of the invention. In addition, the winding apparatus needed to implement the method of the present invention is very advantageous in that its overall arrangement is quite simple.

Accordingly, with the present invention, the quality of the magnetic tape as well as the productivity in the tape winding operation is improved. Particularly, with respect to the in-cassette winding system, the invention provides markedly improved winding characteristics.

The invention will now be illustrated by way of the following Example:

EXAMPLE

The following components were charged into a ball mill and adequately mixed and dispersed to form a magnetic coating liquid.

| Magnetic Coating Liquid for Magnetic Tape: | |
| --- | --- |
| CO-containing magnetic iron oxide (S bet 35 mm/g) | 100 parts by weight |
| Nitrocellulose | 10 parts by weight |
| Polyurethane resin (tradename "Nipporan 2304") | 8 parts by weight |
| CO 203 | 2 parts by weight |
| Carbon black (average particle size: 20 $\mu$m) | 2 parts by weight |
| Stearic acid | 1 part by weight |
| Butyl stearate | 1 part by weight |
| Methyl ethyl ketone | 300 parts by weight |

The substrate of the magnetic tape was made of polyethylene terephthalate and had a thickness of 15 $\mu$m and a width of 1 m. The above magnetic coating liquid was coated onto the substrate to produce a wide raw magnetic tape. Then, this raw tape was cut widthwise to form a plurality of magnetic tape samples having a width of ½ inch.

The winding test was carried out under the following tape winding conditions using the above samples using a winding apparatus of the type shown in FIGS. 1 to 5.

| Tape Winding Conditions | |
| --- | --- |
| Tension of magnetic tape: | Progressively reducing tension: 100 g at initial winding stage and 75 g at final winding stage. |
| Speed of winding tape | 10 m/s (maximum) |
| Material of Magnet: | Sm-Co type |
| Intensity of magnetic field: | 2000 Oe, 1400 Oe and 0 Oe (no magnetic field) |
| Tape urging margin | −0.6, −0.4, 0, +0.2, +0.4, +0.6 mm |
| Tape length: | 247 m |

The results of the winding test are shown in a graph of FIG. 7. In FIG. 7, a mark "O" indicates the case where a magnetic field of 2000 Oe was applied, a mark "Δ" indicates the case where a magnetic field of 1400 Oe was applied, and a mark "X" indicates the case where no magnetic field was applied. For each magnetic field strength, 20 tape samples were wound with the tape urging margin (t) varied. The yield of samples having a good winding appearance was checked. Judgment was made on the premise that a good winding appearance yield of not less than 80% was acceptable. It was thus determined that good results were obtained when the tape urging margin (t) was in the range of −0.5 mm to +0.5 mm.

What is claimed is:

1. A method for winding a magnetic tape onto a flanged tape winding body, comprising the steps of:
   providing a flanged tape winding body whose opposed flanges taper away from each other in a radially outward direction of said tape winding body;
   rotating said flanged tape winding body to wind said magnetic tape onto said flanged tape winding body;
   applying a magnetic field of said magnetic tape as said magnetic tape is being wound on said flanged tape winding body to apply a first force acting on said tape in widthwise direction thereof to urge said tape as it is being wound on said flanged tape winding body in a direction towards one flange of said fanged tape winding body; and
   guiding said magnetic tape by exerting a second force on said tape with guiding means acting in a widthwise direction of said tape as said magnetic tape is being wound on said flanged tape winding body in such a manner that a distance between a lateral edge of said tape at said guiding means which faces an inner surface of said one flange when wound on said tape winding body and a plane passing through an intersection between said inner surface of said one flange and a core of said tape winding body is in a range of −0.5 to +0.5. mm.

2. The tape winding method of claim 1, wherein said distance is in a range of 0 to −0.2 mm.

3. The tape winding method of claim 1, wherein said guiding means comprises a flanged guide roller.

4. The tape winding method of claim 1, wherein said guiding means comprises a plurality of flanged guide rollers.

5. The tape winding method of claim 1, wherein said step of applying a magnetic field to said tape comprises providing an annular shaped magnet disposed around a winding shaft for rotating said flanged tape winding body adjacent said one flange.

6. The tape winding method of claim 5, wherein said magnet has a radial width in a radial direction of a roll of tape completely wound on said tape winding body greater than a radial width of said roll of tape.

7. The tape winding method of claim 1, wherein said step of applying a magnetic field to said tape comprises providing a magnet on a side of said flanged tape winding body opposite said one flange and opposite a winding shaft for rotating said flanged tape winding body.

8. The tape winding method of claim 7, wherein said magnet has a radial width in a radial direction of a roll of tape completely wound on said tape winding body greater than a radial width of said roll of tape.

9. The tape winding method of claim 1, wherein said flanges are tapered at a rate in a range of 1/50 to 1/300.

* * * * *